United States Patent
Sezille

(10) Patent No.: US 9,202,119 B2
(45) Date of Patent: Dec. 1, 2015

(54) METHODS AND SYSTEMS FOR DETERMINING USER LIVENESS

(71) Applicant: Nicolas Jacques Jean Sezille, Dublin (IE)

(72) Inventor: Nicolas Jacques Jean Sezille, Dublin (IE)

(73) Assignee: DAON HOLDINGS LIMITED, George Town (KY)

(*) Notice: Subject to any disclaimer, the term of this patent is extended or adjusted under 35 U.S.C. 154(b) by 74 days.

(21) Appl. No.: 14/057,365

(22) Filed: Oct. 18, 2013

(65) Prior Publication Data

US 2015/0110366 A1 Apr. 23, 2015

(51) Int. Cl.
*G06K 9/00* (2006.01)
*G06K 9/62* (2006.01)

(52) U.S. Cl.
CPC .......... *G06K 9/00906* (2013.01); *G06K 9/0055* (2013.01); *G06K 9/00281* (2013.01); *G06K 9/00288* (2013.01); *G06K 9/00496* (2013.01); *G06K 9/00899* (2013.01); *G06K 9/6247* (2013.01); *G06K 9/6269* (2013.01)

(58) Field of Classification Search
None
See application file for complete search history.

(56) References Cited

U.S. PATENT DOCUMENTS

| | | | | |
|---|---|---|---|---|
| 7,450,782 | B2* | 11/2008 | Lim et al. | 382/284 |
| 8,401,253 | B2* | 3/2013 | Yamada et al. | 382/118 |
| 8,437,513 | B1* | 5/2013 | Derakhshani et al. | 382/115 |
| 8,542,879 | B1* | 9/2013 | Nechyba et al. | G06K 9/00228 382/103 |
| 8,582,835 | B2* | 11/2013 | Cavallini | 382/118 |
| 2005/0207654 | A1* | 9/2005 | Rodyushkin et al. | 382/217 |
| 2008/0192980 | A1* | 8/2008 | Park et al. | G06K 9/00221 382/103 |
| 2009/0175509 | A1* | 7/2009 | Gonion et al. | 382/118 |
| 2011/0052081 | A1* | 3/2011 | Onoe et al. | 382/203 |
| 2011/0135165 | A1* | 6/2011 | Wechsler et al. | 382/118 |
| 2013/0015946 | A1* | 1/2013 | Lau et al. | G07C 9/00 340/5.2 |
| 2013/0016882 | A1* | 1/2013 | Cavallini | 382/117 |
| 2013/0202182 | A1* | 8/2013 | Rowe | 382/133 |
| 2013/0336527 | A1* | 12/2013 | Nechyba et al. | 382/103 |

FOREIGN PATENT DOCUMENTS

EP 2 546 782 A1 1/2013

OTHER PUBLICATIONS

Li, Jiangwei, et al. "Live face detection based on the analysis of fourier spectra."Defense and Security. International Society for Optics and Photonics, 2004.*
Padgett, Curtis, and Garrison W. Cottrell. "Representing face images for emotion classification." Advances in neural information processing systems(1997): 894-900.*
Kil, et al., "Pattern Recognition and Prediction With Applications to Signal Characterization," Modern Acoustics and Signal Processing, 1996, pp. 40-57.
Pan, et al., "Eyeblink-based Anti-Spoofing in Face Recognition from a Generic Webcamera," IEEE, 2007, pp. 1-8.
Extended European Search Report dated May 4, 2015 for counterpart EPO Application No. 14189443.6, pp. 1-10.

* cited by examiner

Primary Examiner — Utpal Shah
Assistant Examiner — Narek Zohrabyan
(74) Attorney, Agent, or Firm — Kevin McDermott, Esq.

(57) ABSTRACT

A method for determining user liveness is provided that includes extracting, by a processor, overlapping differential signals from a first differential signal. Moreover, the method includes calculating principal component analysis coefficients for each extracted differential signal, selecting a subset of the principal component analysis coefficients for each extracted differential signal, and generating an activity result for each extracted differential signal based on the principal component analysis coefficient subset.

17 Claims, 4 Drawing Sheets

US 9,202,119 B2

METHODS AND SYSTEMS FOR DETERMINING USER LIVENESS

BACKGROUND OF THE INVENTION

This invention relates generally to determining user liveness, and more particularly, to methods and systems for determining user liveness as the result of mouth movements.

Users conduct transactions with many different entities in person and remotely over the Internet. Transactions may be network-based transactions for purchasing items from a merchant website or may involve accessing confidential information from a website remotely over the Internet. Entities that own such websites typically require successfully identifying users as the result of an authentication transaction before permitting users to conduct the transactions.

During remotely conducted network-based authentication transactions, users typically interact with an authentication system to prove their claim of identity. Such interactions generally provide a claim of identity and biometric data captured from the user to the authentication system. However, imposters have been known to impersonate users during authentication transactions by providing a false claim of identity supported by fraudulent biometric data in an effort to deceive an authenticating entity into concluding that the imposter is the person they claim to be. Such impersonations are known as spoofing.

Impostors currently use many methods to obtain or create fraudulent biometric data that can be submitted during authentication transactions. For facial biometric data imposters have been known to obtain two-dimensional pictures of others, from social networking sites, and present the obtained pictures to a camera during authentication to support a false claim of identity. Moreover, imposters have been known to eavesdrop on networks during legitimate network-based authentication transactions to surreptitiously obtain genuine biometric data of users. The imposters then use the obtained biometric data for playback during fraudulent authentication transactions. Such fraudulent biometric data are known to be difficult to detect using known liveness detection methods. Consequently, accurately conducting network-based authentication transactions with biometric data captured from a user at a remote location depends on verifying the physical presence of the user during the authentication transaction as well as accurately verifying the identity of the user based on the captured biometric data. Verifying that the biometric data presented during a network-based biometric authentication transaction conducted at a remote location is from a live person at the remote location, is known as liveness detection or anti-spoofing.

BRIEF DESCRIPTION OF THE INVENTION

In one aspect, a method for determining user liveness is provided that includes extracting, by a processor, overlapping differential signals from a first differential signal. Moreover, the method includes calculating principal component analysis coefficients for each extracted differential signal, selecting a subset of the principal component analysis coefficients for each extracted differential signal, and generating an activity result for each extracted differential signal based on the principal component analysis coefficient subset.

In another aspect, a system for determining user liveness is provided that includes a processor and a memory. The memory is operable to store data. The processor is programmed to extract overlapping differential signals from a first differential signal, and to calculate principal component analysis coefficients for each extracted differential signal. Moreover, the processor is programmer to select a subset of the principal component analysis coefficients for each extracted differential signal, and generate an activity result for each extracted differential signal based on the principal component analysis coefficient subset.

In yet another aspect, a computer program recorded on a non-transitory computer-readable recording medium included in a computer for enabling user liveness detection is provided. The computer program includes instructions which, when read and executed by the computer, cause the computer to extract overlapping differential signals from a first differential signal, calculate principal component analysis coefficients for each extracted differential signal, select a subset of the principal component analysis coefficients for each extracted differential signal, and generate an activity result for each extracted differential signal based on the principal component analysis coefficient subset.

DETAILED DESCRIPTION OF THE INVENTION

Figure 1:
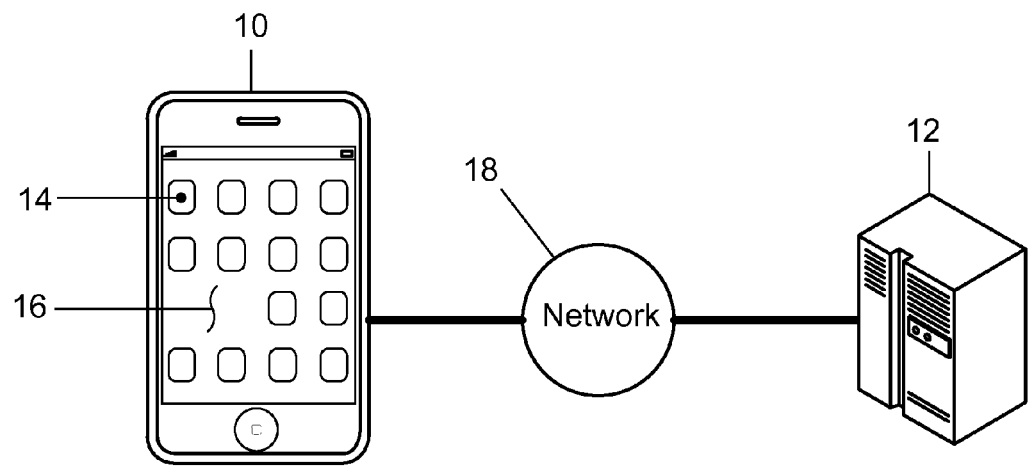
FIG. 1 is a diagram including an exemplary data capture device and an exemplary Liveness Detection Computer System for determining user liveness.

FIG. 1 is a diagram including an exemplary data capture (DC) device 10 and an exemplary Liveness Detection Computer (LDC) System 12 that may each be used for determining user liveness during authentication transactions. The DC device 10 is a smart phone that may store applications and data therein, may display at least one of text and images, and is associated with a user. The DC device 10 may include buttons and icons 14 for at least entering commands and invoking applications stored therein, and a display screen 16 such as, but not limited to, a Liquid Crystal Display (LCD) that displays at least one of text and images. Moreover, the DC device 10 includes at least one camera (not shown) and a microphone (not shown).

The applications stored in the DC device 10 may cause the DC device 10 to perform the functions described herein for the DC device 10 and for the LDC system 12, as well as for any other systems (not shown) and devices (not shown) operable to communicate with the DC device 10. For example, the DC device 10 may include a Face Point Tracker application, and an application that detects mouth activity and determines user liveness based on the detected mouth activity. Data that may be stored in the DC device 10 includes, but is not limited to, captured biometric authentication data, enrollment data records, any information that may be used to authenticate users, mouth surface areas, signals, coefficients, any data related to the Face Point Tracker, and algorithm models.

Although the exemplary DC device 10 is a smart phone, the DC device 12 may alternatively be any device capable of at least storing data and applications, executing the applications, displaying at least one of text and images, and capturing and transmitting data. Such other devices may be portable or stationary and include, but are not limited to, a cellular phone, a tablet computer, a laptop computer, a personal computer (PC) equipped with a web camera (web cam), any type of device having wireless capabilities such as a personal digital assistant (PDA), entertainment devices, and gaming consoles. Entertainment devices include, but are not limited to, televisions. Gaming consoles include, but are not limited to, Xbox 360 and Nintendo Wii.

The DC device 10 is configured to communicate with the LDC system 12, other systems (not shown), and devices (not shown) over a communications network 18. The communications network 18 is a 4G communications network. Alternatively, the communications network 18 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet. The network 18 may also be any type of wired network. Moreover, the DC device 10 is configured to conduct wireless communications such as cellular telephone calls and to wirelessly access the Internet over the network 18.

The DC device 10 may be used to capture authentication data and to process the captured authentication data. The DC device 10 may also authenticate user identities during authentication transactions based on the captured or processed authentication data.

Alternatively, the DC device 10 may transmit captured authentication data to the LDC system 12 for use in conducting authentication transactions and determining whether or not a user is live. The DC device 10 may also process captured authentication data prior to transmitting it to the LDC system 12. For example, the DC device 10 may create a biometric template from captured authentication data and then transmit the biometric template to the LDC system 12. Any number of DC devices 10, that are each associated with a same or different user, may communicate with the LDC system 12.

The LDC system 12 includes components such as, but not limited to, a web server, a database server, an application server, a directory server and a disk storage unit that may be used to store any kind of data. The disk storage unit may store at least one database such as, but not limited to, an authentication database. The application server stores applications therein that cause the LDC system 12 to perform the functions described herein. The LDC system 12 also includes a database management server and an authentication server. The database management server may be used to facilitate transferring data to and from the disk storage device. The authentication server may perform matching of any feature or information associated with users to authenticate the identity of users as described herein.

The LDC system 12 is also configured to communicate with the DC device 10, other systems (not shown), and devices (not shown) over the network 18. Other systems (not shown) that the LDC system 12 and the DC device 10 may communicate with include computer systems of service providers such as, but not limited to, financial institutions, medical facilities, national security agencies, and merchants. Other devices that the LDC system 12 and the DC device 10 may communicate with over the network 18 include, but are not limited to, smart phones, tablet computers, laptop computers, personal computers and cellular phones.

The authentication database may store at least authentication data of each of a plurality of users in enrollment data records. The authentication data may be any kind of information that may be used to authenticate users such as, but not limited to, Global Positioning System (GPS) coordinates, pass-phrases, biometric authentication data, and any combination thereof. Biometric authentication data may correspond to any biometric characteristic desired to be used as a basis of authentication such as, but not limited to, voice, face, finger, iris, palm, and electrocardiogram, and any combination of voice, face, finger, iris, palm, and electrocardiogram. The biometric authentication data may take any form such as, but not limited to, audio recordings, photographic images, and video.

The enrollment data record of each authorized user includes data such as, but not limited to, enrollment biometric data, enrollment biometric templates, and personal data of the user. The enrollment biometric data is raw biometric data obtained from the user during enrollment in the LDC system 12. The enrollment biometric data for each user is processed during enrollment to generate at least one enrollment biometric template, for each respective user, which may be used to conduct authentication transactions. The enrollment biometric data may also be used to conduct authentication transactions. Personal data includes any demographic information regarding a user including, but not limited to, a user's name, gender, age, date-of-birth, address, citizenship and marital status. Each enrollment data record may also include any kind of data that may be used to authenticate the identity of users.

Although the biometric authentication data is described herein as being obtained from each user during enrollment in the LDC system 12, the biometric authentication data may be obtained by other methods such as, but not limited to, automatically reading or extracting them from identity documents or from legacy databases included in other computer systems. Likewise, biometric templates corresponding to the biometric authentication data may be obtained by other methods such as, but not limited to, automatically reading or extracting the biometric templates from identity documents or from legacy databases included in other computer systems.

Templates corresponding to desired biometric authentication data may be obtained in addition to, or instead of, the desired biometric data itself. Such other legacy database systems include, but are not limited to, systems associated with corporate and governmental personnel records, motor vehicle administrations, social security administrations, welfare system administrations, financial institutions and health care providers. Such identity documents include, but are not limited to, passports and driver's licenses. By extracting desired biometric authentication data or biometric templates from a legacy database or identity document, and storing the extracted data in the LDC system 12, user authentication data may be provided during enrollment therein without the user having to directly provide authentication data.

The LDC system 12 may also store configurable authentication policies, some of which may be used to determine data that is to be captured or obtained from users during enrollment in the LDC system 12, and others which may be used to determine an authentication data requirement. The authentication data requirement is the authentication data desired to be captured from users during authentication transactions. The authentication data requirement may be any type of authentication data, or any combination of the same or different types of authentication data and may be determined in any manner.

The LDC system 12 and the DC device 10 may both determine user liveness based on captured authentication data or processed authentication data. Moreover, the LDC system 12 and the DC device 10 may determine whether or not a user is live in any manner. For example, the LDC system 12 and the DC device 10 may determine user liveness based on mouth activity detected in captured authentication data or in the processed authentication data. The DC device 10 and the LDC system 12 may also determine liveness based on measurements derived from geometrical deformations of the face. All data that may be stored in the DC device 10 may be stored in the LDC system 12, and all data that may be stored in the LDC system 12 may be stored in the DC device 10.

The functions described herein as being performed by the DC device 10 and the LDC system 12 may alternatively be performed by any other system (not shown) or any other device (not shown) operable to communicate with the DC device 10 over the network 18. Moreover, any data or information that may be stored in the DC device 10 and the LDC system 12 may alternatively be stored in any system (not shown) or device (not shown) operable to communicate with the DC device 10 over the network 18.

The DC device 10 and the LDC system 12, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the DC device 10 and the LDC system 12. The above examples are exemplary only, and are thus not intended to limit in any way the definition and/or meaning of the term "processor."

The respective memories (not shown) in the DC device 10 and the LDC system 12 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the DC device 10 and the LDC system 12. Moreover, each of the respective memories (not shown) can be a computer-readable recording medium used to store computer programs or executable instructions that are executed, respectively, by the DC device 10 and the LDC system 12. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

Figure 2:
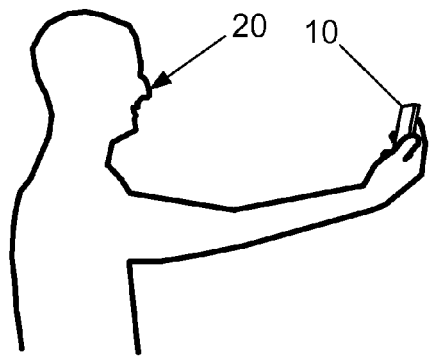
FIG. 2 is a side view of a user capturing authentication data from his self with the data capture device.

FIG. 2 is a side view of a user 20 capturing authentication data from his self with the DC device 10. Specifically, the DC device 10 and the user 20 are positioned relative to each other such that the DC device 10 may capture authentication data from the user 20. The DC device 10 may determine whether or not the user is live while capturing the authentication data or after capturing the authentication data. The DC device 10 is associated with at least one user who may be the person offering authentication data for capture. Instead of the user operating the DC device 10, another person may alternatively operate the DC device 10 to capture authentication data from the user 20.

Figure 3:
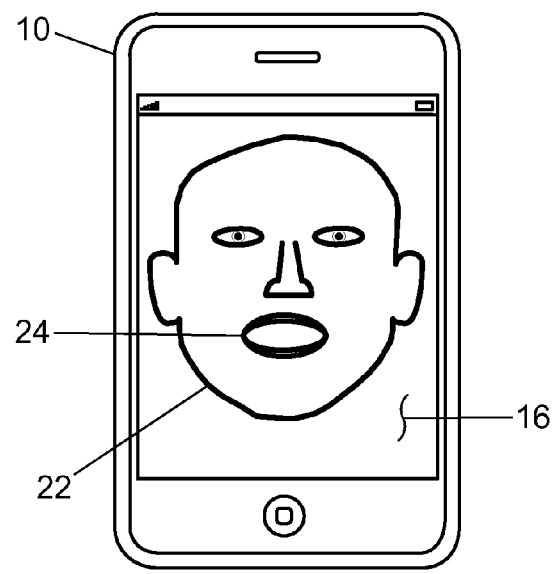
FIG. 3 is an enlarged plan view of the data capture device shown in FIG. 2, displaying an image of the user.

FIG. 3 is an enlarged plan view of the DC device 10 shown in FIG. 2, displaying a facial image 22 of the user 20 on the screen 16. The image 22 includes user biometric characteristics including, but not limited to, the user's eyes, nose, and mouth 24. The image 22 may be captured by the DC device 10 as authentication data in the form of a video. Authentication data captured as a video generally includes a plurality of frames that each includes the image 22.

The Facial Point Tracker application may process each frame while biometric data is being captured or after the biometric data is captured. More specifically, the Facial Point Tracker application may track many different points on the face over time, including points around the mouth 24. The Facial Point Tracker application creates coordinates for each point and creates a timeline for each point. The coordinates and time lines may be stored in the DC device 10 or the LDS system 12.

Figures 4, 5, 6, 7, 8, 9, 10:
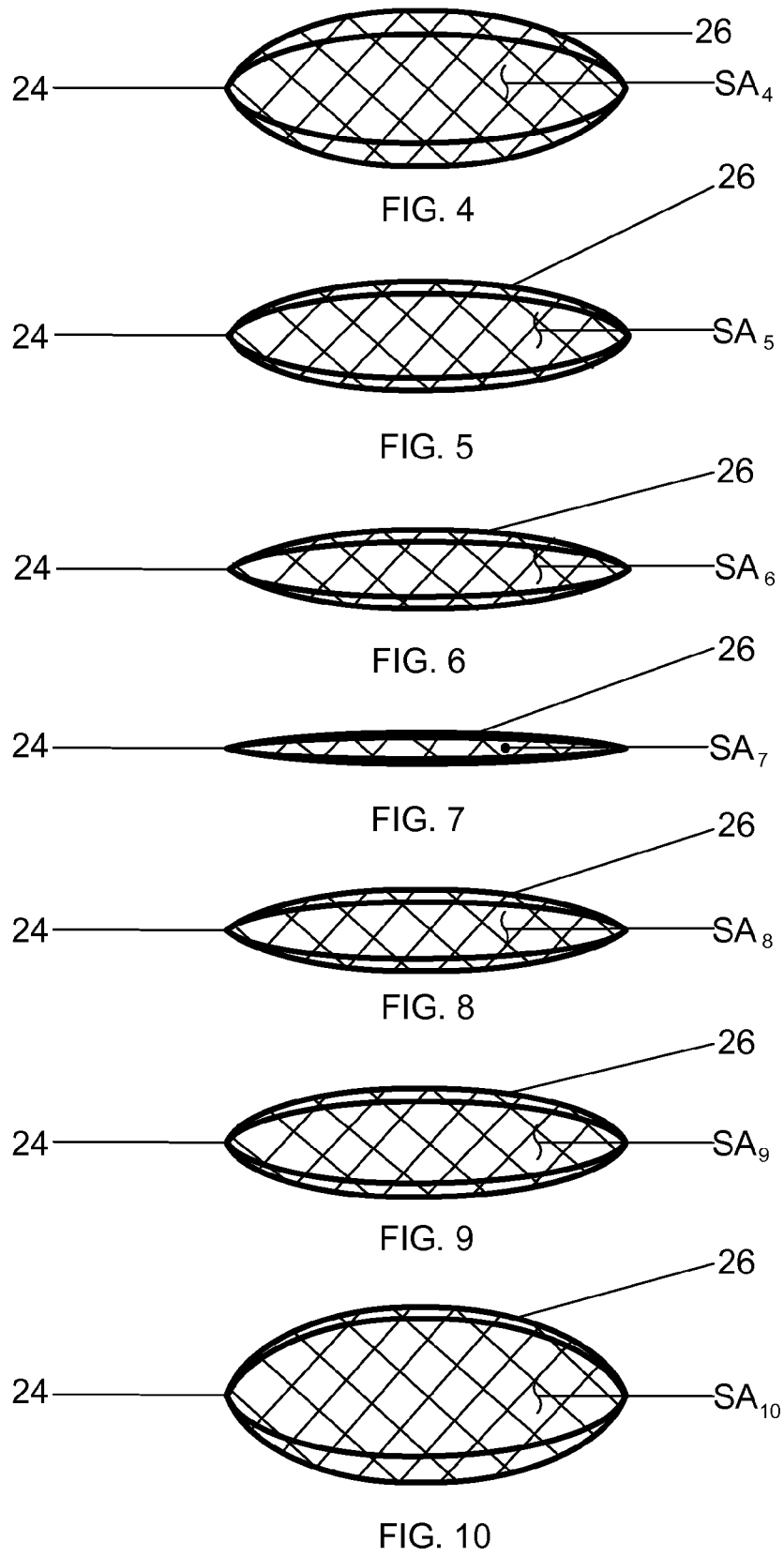
FIG. 4 is an enlarged view of the mouth included in the image shown in FIG. 3 illustrating the mouth surface area.
FIGS. 5-10 are diagrams illustrating enlarged views of the mouth included in the image shown in FIG. 3 illustrating different mouth surface areas.

FIG. 4 is a diagram illustrating an enlarged exemplary view of the mouth 24 shown in FIG. 3, including a cross-hatched mouth surface area $SA_4$. The mouth 24 includes lips, and the outer boundary 26 of the lips defines the surface area $SA_4$ of the mouth 24. The cross-hatched mouth surface area $SA_4$ changes as the user speaks. During authentication transactions, users may be requested to capture voice authentication data as well as a video of the user. The video is made of a plurality of frames and the surface area $SA_4$ of the mouth is generally different in each frame. The mouth 24 is included in a frame from captured biometric data.

The information shown in FIGS. 5-10 is the same information shown in FIG. 4 as described in more detail below. As such, features illustrated in FIGS. 5-10 that are identical to features illustrated in FIG. 4, are identified using the same reference numerals used in FIG. 4.

FIG. 5 is a diagram illustrating the enlarged view of the mouth 24 in a frame captured after the frame shown in FIG. 4. However, the mouth surface area $SA_5$ is smaller than the mouth surface area $SA_4$.

FIG. 6 is a diagram illustrating the enlarged view of the mouth 24 in a frame captured after the frame shown in FIG. 5. However, the mouth surface area $SA_6$ is smaller than the mouth surface area $SA_5$.

FIG. 7 is a diagram illustrating the enlarged view of the mouth 24 in a frame captured after the frame shown in FIG. 6. However, the mouth surface area $SA_7$ is smaller than the mouth surface area $SA_6$.

FIG. 8 is a diagram illustrating the enlarged view of the mouth 24 in a frame captured after the frame shown in FIG. 7. However, the surface area $SA_8$ is larger than the surface area $SA_7$.

FIG. 9 is a diagram illustrating the enlarged view of the mouth 24 in a frame captured after the frame shown in FIG. 8. However, the mouth surface area $SA_9$ is larger than the mouth surface area $SA_8$.

FIG. 10 is a diagram illustrating the enlarged view of the mouth 24 in a frame captured after the frame shown in FIG. 9. However, the mouth surface area $SA_{10}$ is larger than the mouth surface area $SA_9$.

While capturing authentication data, additional information may also be obtained. Such additional information includes, but is not limited to, the locations of the eyes, nose, cheekbones, and chin. Data obtained from the Face Point Tracker application may be used to calculate distances between these characteristics, and the distances may be used to establish ratios useful in determining whether faulty data was used to calculate the mouth surface area of a frame. For example, the distance between the eyes, and between each eye and the chin, may be calculated and used to establish ratios useful for determining faulty data. The user position relative to the DC device 10 may also affect the quality of data captured. For example, if the user turns and does not properly face the DC device 10, the calculated surface areas may not be accurate. Movement of the DC device 10 may also affect the quality of captured biometric data used to calculate mouth surface areas.

The additional information may also be processed to generate a data quality value for each frame. The data quality value generated for a frame corresponds to the mouth surface area SA calculated for the frame. Thus, plotting the data quality values over time yields a data quality signal that corresponds to the mouth surface area signal 28. The data quality values facilitate determining whether a mouth surface area was calculated based on faulty data. When determining whether the mouth 24 is moving, calculated surface areas having higher quality values may be assigned greater weight, while calculated mouth surface areas having lower quality values may be assigned lower weight. Alternatively, any other data quality mitigation approach may be implemented that facilitates accurately detecting mouth movement, or activity, as described herein.

Figure 11:
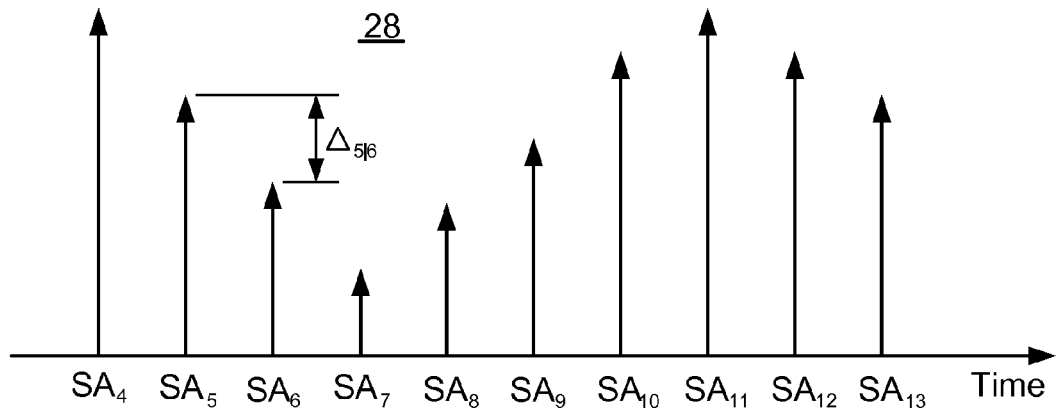
FIG. 11 is a diagram illustrating an exemplary mouth area signal.

FIG. 11 is a diagram illustrating an exemplary mouth surface area signal 28 generated by plotting the mouth surface areas SA over time. More specifically, the mouth surface area signal 28 includes the mouth surface areas $SA_4$ to $SA_{10}$, as well as mouth surface areas $SA_{11}$ to $SA_{13}$ obtained from subsequent frames, plotted over time. The difference ($\Delta$) between each mouth surface area may be determined by subtracting one mouth surface area from another. For example, the difference ($\Delta_{5/6}$) between $SA_6$ and $SA_5$ is calculated by subtracting $SA_5$ from $SA_6$. Although the mouth activity signal 28 includes ten mouth surface areas $SA_4$ to $SA_{13}$, any number of mouth surface areas SA may alternatively be calculated and plotted over time to define the mouth surface area signal 28.

Figure 12:
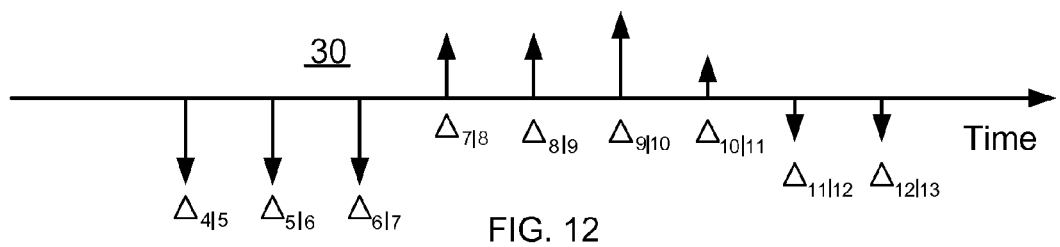
FIG. 12 is a diagram illustrating an exemplary differential signal derived from the mouth area signal.

FIG. 12 is a diagram illustrating an exemplary differential signal 30 derived from the mouth surface area signal 28 by plotting the mouth surface area SA differences ($\Delta$) between all of the frames over time. Sectioned differential signals may be derived from the differential signal 30 and used to facilitate detecting mouth activity.

Figure 13:
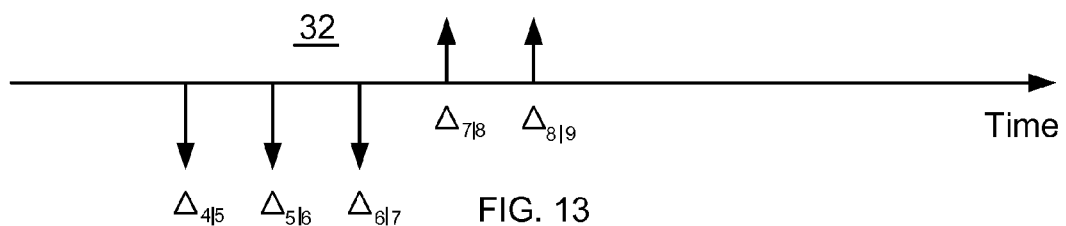
FIG. 13 is a diagram illustrating an exemplary partial differential signal.
Figure 14:
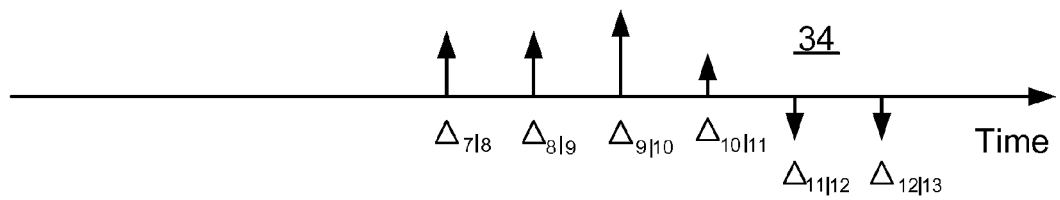
FIG. 14 is a diagram illustrating another exemplary partial differential signal.

The information shown in FIGS. 13 and 14 is similar to that shown in FIG. 12 as described in more detail below. As such, features illustrated in FIGS. 13 and 14 that are identical to features illustrated in FIG. 12, are identified using the same reference numerals used in FIG. 12.

FIG. 13 is a diagram illustrating an exemplary sectioned differential signal 32 that does not include all of the mouth surface area SA differences ($\Delta$) included in the signal 30. Specifically, the sectioned differential signal 32 includes the differences $\Delta_{4/5}$, $\Delta_{5/6}$, $\Delta_{6/7}$, $\Delta_{7/8}$, and $\Delta_{8/9}$.

FIG. 14 is a diagram illustrating another exemplary sectioned differential signal 34 similar to signal 32 shown in FIG. 13. However, the differential signal 34 includes a different subgroup of mouth surface area SA differences ($\Delta$). The subgroup of SA differences ($\Delta$) includes $\Delta_{7/8}$, $\Delta_{8/9}$, $\Delta_{9/105}$ $\Delta_{10/11}$, $\Delta_{11/12}$, and $\Delta_{12/13}$. Because both differential signals 32 and 34 include the differences $\Delta_{7/8}$, $\Delta_{8/9}$, the signals 32 and 34 overlap. Moreover, because the signals 32 and 34 are plotted over time, the overlap at differences $\Delta_{7/8}$, $\Delta_{8/9}$ represents a temporal overlap. The signals 32 and 34 are successive sectioned differential signals. Although two successive sectioned differential signals 32 and 34 are described herein, any number of sectioned overlapping differential signals may alternatively be derived from the differential signal 28.

The signals 28, 30, 32, 34 may be stored in the DC device 10 and the LDC system 12. Moreover, the signals 28, 30, 32, 34 may be used to detect mouth activity during authentication transactions and thus facilitate determining whether the user is live.

Figure 15:
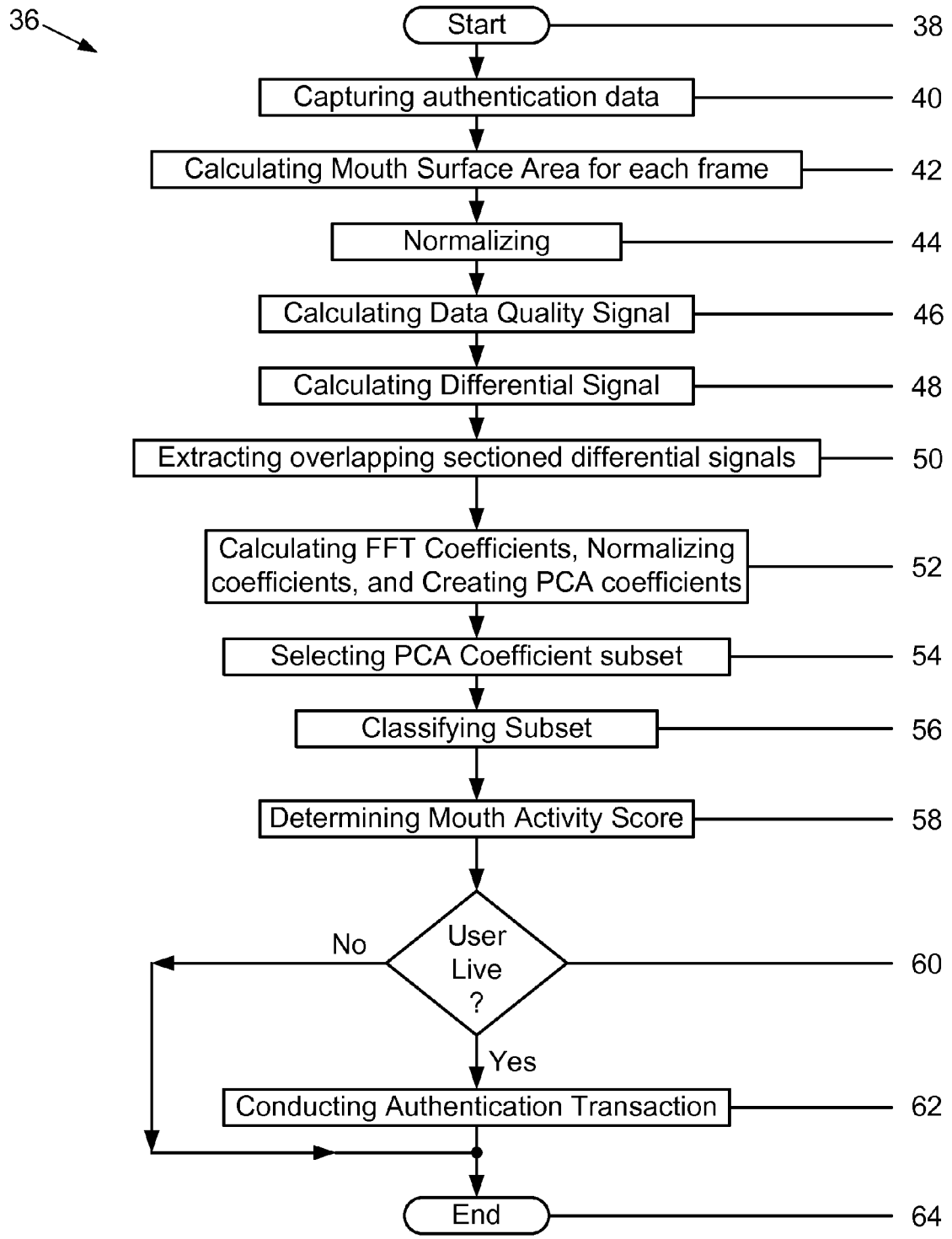
FIG. 15 is a flowchart illustrating an exemplary method for determining user liveness during authentication transactions.

FIG. 15 is a flowchart 36 illustrating an exemplary method for determining user liveness during authentication transactions. The process starts 38 with a user activating his DC device 10 and capturing facial authentication data 40 from his self with the DC device 10. The facial authentication data is captured as a video.

After capturing the authentication data 40, processing continues by locating the mouth 24 in each frame, calculating 42 the mouth surface area SA for each frame, and generating a mouth area signal 28 by plotting the calculated mouth surface areas SA over time. The captured facial authentication data is an image 22 which is generally a different size for different users because most users hold the DC device 10 in a different position while capturing biometric data, have different sized heads and have different sized mouths. As a result, the distances and ratios calculated from the Face Point Tracker application data are also different for each user. Thus, processing continues by normalizing 44 the information calculated or generated from the Face Point Tracker data. Such information includes, but is not limited to, calculated distances and ratios. After normalizing 44, processing continues by calculating a data quality signal 46 that corresponds to the mouth surface area signal 28.

Next, processing continues by calculating 48 the differential surface area SA signal 30 and extracting 50 a succession of overlapping sectioned differential surface area SA signals 32, 34 from the differential SA signal 30. Any number of successive overlapping sectioned differential surface area SA signals may be extracted from the signal 30. After extracting 50 the overlapping sectioned differential surface area signals 32 and 34, processing continues by calculating 52 the Fast Fourier Transform (FFT) spectral coefficients for each overlapping sectioned differential surface area signal, and normalizing the spectral coefficients. Next, processing continues by projecting the normalized FFT spectral coefficients onto a pre-trained Principal Component Analysis (PCA) basis, and creating 52 a corresponding set of PCA coefficients. After creating 52 the set of PCA coefficients, processing continues by selecting 54 a subset of the PCA coefficients.

The subset of created PCA coefficients is selected in accordance with a standard subset determined before conducting the authentication transaction. For example, the standard subset may require selecting each fifth created coefficient to be in the subset of the created PCA coefficients. The subset of PCA coefficients is determined by a feature selection algorithm which selects the best set of PCA coefficients to achieve the maximum discrimination power based on classifier predictions. The subset includes any number of PCA coefficients that enable determining whether the mouth 24 is moving.

Next, processing continues by classifying 56 the PCA coefficient subset by creating a vector from the PCA coefficient subset, and inputting the vector into a pre-trained Support Vector Machines (SVM) algorithm which generates a binary result regarding mouth activity for each overlapping signal. The result may be referred to as an activity result. Specifically, the SVM algorithm generates a one (1) if mouth activity is detected in an overlapping signal and a zero (0) if no activity is detected. After generating the result for each overlapping signal, processing continues by determining 58 a mouth activity score. The mouth activity score is calculated by aggregating the results generated for all the overlapping signals. When the mouth activity score meets or exceeds a threshold, processing continues by determining 60 that the mouth 24 is moving in the captured video and that the user is therefore live 60. After conducting an authentication transaction 62 with the captured authentication data, processing ends 64. However, when the mouth activity score is less than the threshold, processing continues by determining that the mouth is not moving and that the user is therefore not live and may be an imposter. Next, processing ends 64.

Although the exemplary process classifies the PCA coefficient subset with an SVM algorithm, any other machine learning technique may alternatively classify the selected PCA coefficient set. Such other machine learning techniques include, but are not limited to, Neural Networks and Random Forest. Alternatively, the PCA coefficient subset may be processed by a regressor instead of a classifier at operation 56. It should be understood that the SVM algorithm, Neural Networks, and Random Forest may each function as a regressor in addition to functioning as a classifier.

Although the mouth surface areas SA are used to generate the signal 28, and user liveness detection is based on the signal 28, other measurements derived from geometrical deformations of the face may alternatively be used to generate other signals that may serve as the basis for determining user liveness. Such other measurements include, but are not limited to, distance measurements along the cheekbones, cheeks and chin. These other measurements may also be used to complement the mouth surface area signal 28 when user liveness detection is based on the signal 28.

In each embodiment, the above-described methods and systems for determining user liveness during authentication transactions facilitates accurately verifying the physical presence of users during authentication transactions and facilitates increasing the trustworthiness of authentication transaction results. More specifically, a differential surface area signal is derived from a mouth activity signal. A succession of sectioned differential surface area signals are derived from the differential surface area signal. The successive sectioned signals overlap with each other. FFT coefficients are calculated for each sectioned differential surface area signal, and normalized. PCA coefficients are created for each sectioned differential surface area signal, based on the FFT coefficients, and a subset of the created PCA coefficients is selected for each sectioned differential surface area signal.

A vector created from each PCA coefficient subset is processed by an SVM classifier and generates a result for each sectioned differential surface area signal. The results are aggregated into a composite result which is compared against a threshold score. When the composite result is equal to or greater than the threshold, the mouth 24 is determined to be moving, the user is considered live, and an authentication transaction is conducted. As a result, the physical presence of a user during an authentication transaction can be accurately verified. Furthermore, the trustworthiness of authentication transaction results are facilitated to be increased and costs associated with successful spoofing are facilitated to be reduced.

Exemplary embodiments of methods for determining user liveness during authentication transactions are described above in detail. The methods are not limited to use with the specific authentication computer systems described herein, but rather, the methods can be utilized independently and separately from other computer components described herein. For example, the methods for determining the liveness of users described herein may be implemented by most computer systems, and may be used for a wide range of authentication scenarios, including remotely conducting a payment transaction over the Internet. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for determining user liveness comprising:
    extracting, by a processor, overlapping differential signals from a first differential signal;
    creating a principal component analysis coefficient set for each of the extracted overlapping differential signals;
    selecting a principal component analysis coefficient subset from each set; and
    generating an activity result for each of the extracted overlapping differential signals based on the respective subset.

2. A method for determining user liveness in accordance with claim 1 further comprising:
    aggregating the activity results and comparing the aggregated activity results against a threshold score; and
    determining the user is live when the aggregated activity result is equal to or greater than the threshold score.

3. A method for determining user liveness in accordance with claim 1, said generating step comprising classifying the principal component analysis coefficient subset for each of the extracted overlapping differential signals using a machine learning technique.

4. A method for determining user liveness in accordance with claim 1, said generating step comprising:
    creating a vector for each subset;
    inputting each vector into a support vector machines algorithm; and
    generating the activity result for each of the extracted overlapping differential signals with the support vector machines algorithm.

5. A method for determining user liveness in accordance with claim 1, said creating step comprising:
    calculating spectral coefficients for each of the extracted overlapping differential signals;
    normalizing the spectral coefficients;
    projecting the normalized spectral coefficients onto a pre-trained principal component analysis basis; and
    creating a principal component analysis coefficient set from the projected normalized spectral coefficients.

6. A method for determining user liveness in accordance with claim 1, said selecting step comprising processing the principal component analysis subset of each of the extracted overlapping differential signals with a regressor to generate an activity result for each of the extracted overlapping differential signals.

7. A method for determining user liveness comprising:
creating, by a processor, a vector for each principal component analysis coefficient subset selected from a respective principal component analysis coefficient set, the coefficients created from captured user authentication data;
generating an activity result for each principal component subset and aggregating the activity results into a composite result; and
determining the user is live when the composite result is equal to or greater than a threshold score.

8. A method for determining user liveness in accordance with claim 7, said creating step further comprising selecting the principal component analysis coefficients to include in each principal component subset to achieve maximum discrimination power.

9. A method for determining user liveness in accordance with claim 7, further comprising:
capturing authentication data from the user;
calculating a differential surface area signal from the captured authentication data;
extracting a succession of overlapping sectional differential surface area signals from the calculated differential signal; and
creating a principal component analysis coefficient set for each of the extracted successive overlapping differential surface area signals.

10. A method for determining user liveness in accordance with claim 7, further comprising:
extracting a succession of overlapping sectional differential surface area signals from a first differential signal;
calculating spectral coefficients from each extracted signal;
normalizing the spectral coefficients; and
projecting the normalized spectral coefficients onto a pre-trained principal component analysis basis to create the principal component analysis coefficient sets.

11. A method for determining user liveness in accordance with claim 7, said generating step comprising:
generating a one when activity is detected in a subset; and
generating a zero when activity is not detected in a subset.

12. A method for determining user liveness in accordance with claim 7 further comprising:
calculating a mouth area for each frame in the captured user authentication data;
calculating a data quality value for each frame; and
assigning greater weight to mouth areas having higher quality values and lower weight to mouth areas having lower quality values.

13. A system for determining user liveness comprising:
a processor; and
a memory operable to store data, said processor being programmed to:
creating a vector for each principal component analysis coefficient subset selected from a respective principal component analysis coefficient set, the coefficients being created from captured user authentication data;
generate an activity result for each principal component subset and aggregating the activity results into a composite result; and
determine the user is live when the composite result is equal to or greater than a threshold score.

14. A system for determining user liveness in accordance with claim 13, said processor being further programmed to select the principal component analysis coefficients to include in each principal component subset to achieve maximum discrimination power.

15. A system for determining user liveness in accordance with claim 13, said processor being further programmed to:
calculate a differential surface area signal from captured authentication data;
extract a succession of overlapping sectional differential surface area signals from the calculated differential signal; and
create a principal component analysis coefficient set for each of the extracted succession of overlapping sectional differential surface area signals.

16. A system for determining user liveness in accordance with claim 13, said processor being further programmed to:
extract a succession of overlapping sectional differential surface area signals from a first differential signal;
calculate spectral coefficients from each extracted signal;
normalize the spectral coefficients; and
project the normalized spectral coefficients onto a pre-trained principal component analysis basis to create the principal component analysis coefficient sets.

17. A system for determining user liveness in accordance with claim 13, said processor being further programmed to:
calculate a mouth area for each frame in the captured user authentication data;
calculate a data quality value for each frame; and
assign greater weight to mouth areas having higher quality values and lower weight to mouth areas having lower quality values.

* * * * *